United States Patent Office 3,600,146 Patented Aug. 17, 1971

3,600,146

GLASS BUSHING WITH HIGH EMISSIVITY COATING

Thomas H. Jensen, Murrysville, Pa., assignor to PPG Industries, Inc., Pittsburgh, Pa.

Filed July 23, 1968, Ser. No. 746,800
Int. Cl. C03k *37/08*
U.S. Cl. 65—11 3 Claims

ABSTRACT OF THE DISCLOSURE

Platinum and platinum alloys such as those used for bushings and bushing assemblies in the manufacture of glass fibers have relatively low emissivity values. In some processes parts of such bushings or assemblies are exposed to radiant energy and to increase radiant heat exchange, a coating of a material having a relatively high emissivity is applied to at least those parts of the bushing or assembly so exposed. Such coatings are continuous throughout their extent and preferably have a coefficient of expansion compatible with the metal of the bushing or assembly.

BACKGROUND OF THE INVENTION

Continuous glass fibers are conventionally produced by attenuating streams of glass flowing from orifices or tips in a bushing which contains a body of molten glass. The streams are attenuated into fibers which are grouped together and collected as a strand. The bushings are conventionally made of a platinum alloy, such as 90% by weight platinum and 10% by weight rhodium. The bushings are generally electrically heated by providing bus bars at opposite ends thereof and passing an electric current therethrough.

In another process, the fiber-producing bushings, instead of being electrically heated, are radiantly heated. However, platinum and its alloys are relatively poor heat transfer materials in as far as radiation exchange is concerned, so that the process wherein radiant heat exchange is utilized, suffers from the poor radiant heat exchange coefficient of platinum and its alloys.

THE INVENTION

It has been found that the coefficient of radiant heat exchange of platinum and its alloys can be materially increased and thus improved by applying a coating of a material having a relatively high emissivity to at least those portions of the metal or metal alloy which is exposed to radiant energy. In order to be effective the coating should be continuous throughout its extent and the material thereof should have a coefficient of expansion compatible with the metal.

The coating should be continuous throughout its extent and thin coatings as on the order of 0.001 to 0.002 inch are desirable as compared to thick coatings, as for example, over 0.002 inch. A thick coating may spall and affect the continuous nature thereof. Thick coatings are not stable because of the possibility of thermal shock. Thin coating are desirable because of little effect on the heat transfer aspects of the combined system, i.e., the coating and the base metal.

Various coating materials can be used, such as chrome oxide, nickel alumnide, zirconia oxide, alumina, nickel oxide or mixtures thereof and Lithoid, a material manufactured by Lithoid Corporation, containing by weight (wet chemical analysis),

| | |
|---|---|
| $SiO_2$ | 29.38 |
| $Na_2O$ | 2.83 |
| $K_2O$ | 7.01 |
| $Al_2O_3$ | 3.11 |
| $Cr_2O_3$ | 4.15 |
| $Co_3O_4$ | 0.16 |
| $Cu_2O$ | 2.16 |
| $ZrO_2$ | 50.28 |
| Ti, Bi, Mn, Ca, Mg | Trace |
| Moisture | 0.06 |
| Ignition loss | 0.33 |
| Absorption spectrophotometric analysis: | |
| $Fe_2O_3$ | 0.46 |
| | 99.93 |

The coating materials are applied by any suitable coating technique, as by flame spraying techniques, or by various surface preparations, such as an etching of the part to be coated, followed by flame spraying the coating thereon.

Platinum has an emissivity of 0.19 at 2500° F. The emissivity of the listed materials at 2500° F. are as follows:

| | |
|---|---|
| Lithoid | .58 |
| Chrome oxide | .96 |
| Nickel alumnide | .91 |
| Zirconia oxide+nickel alumnide | .96 |
| Alumina+nickel alumnide | .94 |

Temperatures on the order of 2500° F. are not uncommon for a fiber-producing bushing.

THE DRAWINGS

FIG. 1 is an illustration of a typical radiantly heated fiber-forming arrangement using a bushing assembly according to this invention;

FIG. 2 is a partial plan view of the apparatus of FIG. 1 with parts broken away, and FIG. 3 is a typical bushing assembly, such as that illustrated in FIG. 1.

THE PREFERRED EMBODIMENT

Glass from a melting tank is continuously introduced into a trough-like container 16 to form a pool 18 of molten glass. Glass is delivered from the pool 18 to one or more bushing units 20 from which fibers 22 are drawn.

The trough-like container 16 is preferably constructed of elongated insulating, refractory block 24 which forms the bottom and side walls thereof and is provided with a platinum or platinum-alloy liner 26 for glass contact. Contamination of the glass in the pool 18 is avoided by the choice of materials.

The container 16 is located within an enclosure 28 of refractory material of good insulative property, which enclosure is elongated and coextensive in length with the refractory block 24. The insulative refractory block 24 actually forms a portion of the bottom wall of the enclosure. The bottom of the enclosure 28 also includes elongated refractory members 30 extending the length thereof and being so shaped to support either bushing units 20 or refractory spacers 32 placed between adjacent bushing units. The members 30, bushing units 20, spacers 32, together with the bottom of the refractory block 24, thus form the bottom of the enclosure. Port openings 34 are located along the enclosure 28 to permit heat to be introduced therewithin. Such heat may be provided by gas burners of conventional design and construction and thus are not shown in detail. The enclosure 28 becomes a radiant unit, so that all parts therein are uniform in temperature.

Each of the bushing units 20 includes a bottom wall 36 provided with a plurality of tips 38 generally arranged in aligned rows, each tip having an orifice through which molten glass flows to be drawn and attenuated into fibers 22. There are provided side walls 40 and a top wall 42 to which is attached one end of a feed tube 44, referred to as a siphon tube. The walls of the bushing unit form a receptacle for molten glass supplied through the siphon tube 44, the other end of which is immersed in the pool of molten glass 18. The top wall 42 is preferably spaced from the bottom wall a distance of less than one inch, generally on the order of one-half or less and not more than one and one-half inches. This construction permits the radiant heat of the enclosure to be effective to maintain the uniformity of temperature of the glass within the bushing receiver because the top plate receives radiant energy from the massive heat within the enclosure. Each bushing unit is preferably constructed of platinum or a platinum alloy, so as not to contaminate the glass, and is constructed so as to be received between and supported by the adjacent refractory members 30.

When necessary suitable means, generally identified as 46, are provided beneath the bushing and between the rows of bushing tips to cool the glass flowing from the tips. Such means are usually referred to as "cone coolers" because of the cone shape assumed by the glass at the bushing tips. Any type of cone cooler can be used; for example, fins connected to a cooled header, or wires or troughs over which cooling water from a header is passed. Such cone coolers do not form a part of the invention described and claimed herein, so are only generally described.

Conventional drawing means including a gathering pad, a size applicator, a traversing means and a winding apparatus are used (but not shown in detail as they form no part of the invention) to draw the fibers which are grouped and wound as a strand.

To use the arrangement described, it is only necessary to locate a bushing unit in the desired location with its feed or siphon tube immersed within the glass in the pool 18. A suction head is placed against the bushing bottom to apply suction to the unit which draws molten glass into the siphon tube. Because the bushing is below the glass in the pool, the glass is siphoned from the pool to the bushing tips. As many bushing units may be used as space permits and the location of one bushing with respect to the others can be varied within the limits of the arrangement. In order to stop the flow of glass from a bushing, it is only necessary to remove the siphon tube from the pool of molten glass. To adapt the arrangement to the super-fine process requires a change in bushing tip size (i.e., a different bushing) and the addition of pulling, guide and blast equipment required in the process.

As can be seen in FIG. 3, the portions of the bushing unit 20 exposed to radiant energy are suitably coated as at 48, as before described. This includes the upper surface or wall 42 of the bushing unit and at least a portion of the tube 44.

SPECIFIC EXAMPLE

In order to evaluate coated platinum, a series of samples were made using discs of platinum 0.020 inch thick and 0.062 inch thick. There were four samples 0.020 inch thick and eleven samples 0.062 inch thick. All were flame sprayed with the coating material. The Lithoid samples (all 0.062 inch thick) were prepared as follows:

| Sample No.: | Surface treatment |
|---|---|
| 1 | No surface treatment, conventional method of spray coating. |
| 2 | Heated to 2500° F., then spray coated. |
| 3 | Etched in aqua regia acid, heated to 2500° F., coated. |
| 4 | Surface lightly sandblasted, heated to 2500° F., coated. |
| 5 | Etched in aqua regia acid, cleaned with Lithoid cleaner and primer, then coated. |
| 6 | Sandblasted, cleaned with cleaner and primer, coated. |

All samples were aged at 2500° F., a temperature not uncommon for fiber forming bushings. Some samples of 0.020 inch thick materials were aged for 90 hours and some were aged for 336 hours, all 0.062 inch thick samples were aged for 336 hours. The emissivities of the samples before and after aging were as follows:

| Sample | .020″ thick samples | | | .062″ thick samples | |
|---|---|---|---|---|---|
| | Before aging | After 90 hrs. aging | After 336 hrs. aging | Before aging | After 336 hrs. aging |
| Chrome oxide | .98 | .96 | .96 | .90 | .96 |
| Nickel alumnide | .92 | .91 | .93 | .94 | .92 |
| Zirconia oxide | .96 | .96 | .94 | .88 | .96 |
| $Al_2O_3$ | .90 | .94 | .93 | .88 | .96 |
| Nickel oxide | | | | .92 | .90 |
| Lithoid #1 | | | | .58 | .56 |
| Lithoid #2 | | | | .58 | .56 |
| Lithoid #3 | | | | .58 | .58 |
| Lithoid #4 | | | | .66 | .60 |
| Lithoid #5 | | | | .56 | .54 |
| Lithoid #6 | | | | .66 | .62 |

All samples tested had emissivities above that of the uncoated platinum or platinum aloy. Aging of the samples indicates that the emissivity value of coated platinum remains substantially constant for a time duration; in other words, the emissivity will not substantially change during periods of operation of the bushing unit.

I claim:

1. A glass fiber-producing bushing assembly of a platinum containing alloy having a plurality of orifices for the passage of glass therethrough and at least some portions exposed to radiant energy and having a coating of a material having a relatively high emissivity with respect to said platinum containing alloy thereon, said coating being continuous throughout its extent and having a coefficient of expansion compatible with that of said alloy.

2. A bushing as recited in claim 1 in which said coating is selected from the group consisting of chrome oxide, nickel alumnide, zirconia oxide, alumina, nickel oxide and mixtures thereof and a substance having the following composition:

| | Percent weight |
|---|---|
| $SiO_2$ | 29.38 |
| $Na_2O$ | 2.83 |
| $K_2O$ | 7.01 |
| $Al_2O_3$ | 3.11 |
| $Cr_2O_3$ | 4.15 |
| $Co_3O_4$ | 0.16 |
| $Cu_2O$ | 2.16 |
| $ZrO_2$ | 50.28 |
| $Fe_2O_3$ | 0.46 |
| Water | 0.06 |
| Ignition loss | 0.33 |
| Ti, Bi, Mn, Ca, Mg | Trace |

3. A bushing as recited in claim 1 in which said coating is a material having an emissivity at 2500° F. above about 0.19.

References Cited

UNITED STATES PATENTS 2,608,968 9/1952 Moseley ---------- 165—133X
3,102,532 9/1963 Shoemaker -------- 165—133X

FOREIGN PATENTS 820,526 9/1959 Great Britain --------- 65—12

OTHER REFERENCES

Metco Inc., Bulletin 10 F 1/M 8-63, 117-105.2, 1963.

ALFRED L. LEAVITT, Primary Examiner

J. H. NEWSOME, Assistant Examiner

U.S. Cl. X.R.

65—374; 29—199; 165—133; 117—127, 169, 105.2